(12) United States Patent
Tano et al.

(10) Patent No.: US 10,511,227 B2
(45) Date of Patent: Dec. 17, 2019

(54) FUEL CELL SYSTEM AND METHOD FOR CONTROLLING THE FUEL CELL SYSTEM

(71) Applicant: TOYOTA JIDOSHA KABUSHIKI KAISHA, Toyota-shi, Aichi-ken (JP)

(72) Inventors: Yutaka Tano, Toyota (JP); Takahiro Umehara, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/284,062

(22) Filed: Feb. 25, 2019

(65) Prior Publication Data
US 2019/0273437 A1    Sep. 5, 2019

(30) Foreign Application Priority Data

Mar. 5, 2018    (JP) .................................. 2018-038481

(51) Int. Cl.
*H02M 3/158*    (2006.01)
*H02M 1/32*    (2007.01)
(Continued)

(52) U.S. Cl.
CPC ..... *H02M 3/1584* (2013.01); *H01M 8/04373* (2013.01); *H01M 8/04597* (2013.01);
(Continued)

(58) Field of Classification Search
CPC .. H02M 3/1584; H02M 1/32; H01M 8/04373; H01M 8/04597; H01M 8/04895; H01M 8/04992; H01M 8/04574; H01M 8/04582; H01M 8/04589; H01M 8/04604; H01M 8/04611; H01M 8/04619;
(Continued)

(56) References Cited

U.S. PATENT DOCUMENTS

| 2009/0179623 A1* | 7/2009 | Mimatsu | ................. H02M 1/38 323/282 |
| 2011/0025248 A1* | 2/2011 | Jang | .................... H02M 3/1584 318/521 |

(Continued)

FOREIGN PATENT DOCUMENTS

JP    2012-248421    12/2012

*Primary Examiner* — Adolf D Berhane
*Assistant Examiner* — Kevin H Sprenger
(74) *Attorney, Agent, or Firm* — Finnegan, Henderson, Farabow, Garrett & Dunner, LLP

(57) ABSTRACT

The present disclosure is made in order to reduce inaccuracy of current sensors. A fuel cell system includes a converter configured to convert output voltage of the fuel cell, and a current sensor including a preliminarily magnetized magnetic core and configured to measure current flowing in the converter from the fuel cell. A controller operates in a first driving mode in which a maximum current value in a target circuit of current measurement by the current sensor is lower than a current value for preliminary magnetization of the magnetic core, and a second driving mode in which the maximum current value in the target circuit is higher than the maximum current value in the target circuit in the first driving mode. When an accumulated temperature value of the current sensor in the first driving mode exceeds a threshold, the second driving mode is executed, followed by the first driving mode.

8 Claims, 7 Drawing Sheets

(51) Int. Cl.
  *H01M 8/04537* (2016.01)
  *H01M 8/0432* (2016.01)
  *H01M 8/04858* (2016.01)
  *H01M 8/04992* (2016.01)
  *B60L 50/51* (2019.01)
  *B60L 50/70* (2019.01)

(52) U.S. Cl.
  CPC ... *H01M 8/04895* (2013.01); *H01M 8/04992* (2013.01); *H02M 1/32* (2013.01); *B60L 50/51* (2019.02); *B60L 50/70* (2019.02); *B60L 2210/10* (2013.01); *B60L 2210/40* (2013.01); *H01M 2250/20* (2013.01); *H02M 2001/327* (2013.01)

(58) Field of Classification Search
  CPC ......... H01M 8/04738; H01M 8/04902; H01M 8/0491; H01M 8/04917; H01M 8/04925; H01M 8/04932; H01M 8/094; B60L 50/70
  See application file for complete search history.

(56) References Cited

U.S. PATENT DOCUMENTS

| | | | | |
|---|---|---|---|---|
| 2012/0256571 | A1* | 10/2012 | Ang | H02M 3/1584 318/400.3 |
| 2016/0013644 | A1* | 1/2016 | Mitsutani | B60L 58/15 307/31 |
| 2018/0054151 | A1* | 2/2018 | Matsumoto | B60L 50/51 |
| 2018/0145350 | A1* | 5/2018 | Matsumoto | H01M 16/006 |

\* cited by examiner

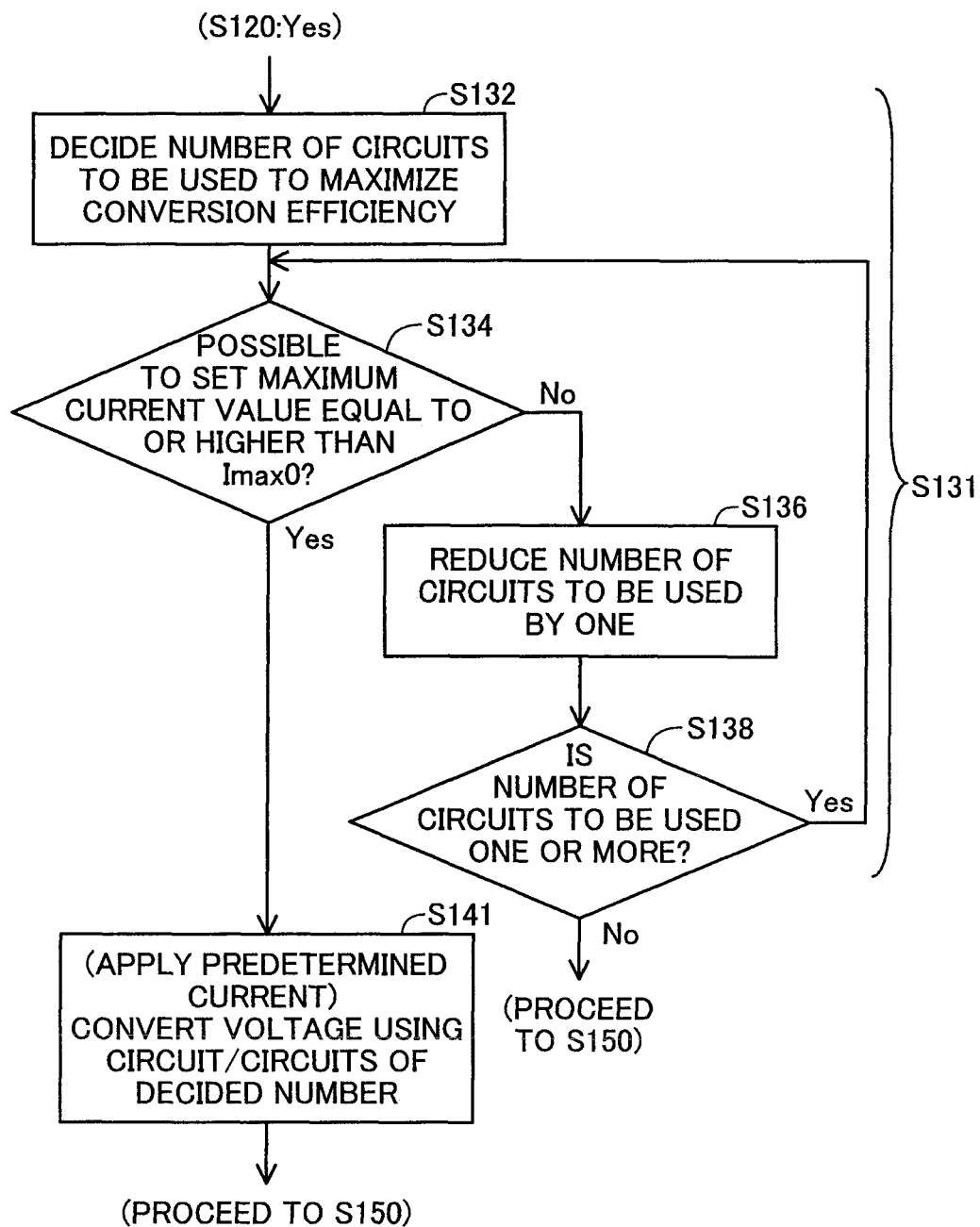

FUEL CELL SYSTEM AND METHOD FOR CONTROLLING THE FUEL CELL SYSTEM

CROSS REFERENCE TO RELATED APPLICATIONS

The present application claims the priority based on Japanese Patent Application No. 2018-038481 filed on Mar. 5, 2018, the disclosure of which is hereby incorporated by reference in its entirety.

BACKGROUND

Field

The present disclosure relates to a fuel cell system including a current sensor configured to measure current flowing in a reactor of a converter that boosts output voltage of a fuel cell.

Related Art

Conventionally, the following technology exists for the current sensor configured to measure the current flowing in the reactor of the converter that boosts the output voltage of the fuel cell in the fuel cell system. That is, in order to eliminate an offset from a zero point, an origin point learning of the current sensor is performed, for example, when the fuel cell system is manufactured or activated. However, the offset from the zero point in the current sensor may be generated in the case in which the fuel cell system is put in operation for a long period of time.

In a technology disclosed in JP 2012-248421A, the origin point learning is performed not only when the fuel cell system is activated but also when a driving condition of no current application is met subsequently. More specifically, in the technology disclosed in JP 2012-248421A, the origin point learning is performed when a switching element of the converter is suspended and output voltage of the converter is higher than input voltage of the converter.

However, there are some cases in which the offset from the zero point is still generated and inaccuracy in the current sensor is not sufficiently eliminated by the technology disclosed in JP 2012-248421A.

SUMMARY

According to one aspect of the present disclosure, a fuel cell system is provided. The fuel cell system comprises a fuel cell, a converter configured to convert output voltage of the fuel cell, a current sensor including a preliminarily magnetized magnetic core and configured to measure current flowing in the converter from the fuel cell, a temperature sensor configured to measure temperature of the current sensor, and a controller configured to control the fuel cell system. The controller, as driving modes of the fuel cell system, comprises a first driving mode in which a maximum value of the current flowing in a target circuit of current measurement by the current sensor is smaller than a current value for preliminary magnetization of the magnetic core and a second driving mode in which a maximum value of the current flowing in the target circuit is larger than the maximum value of the current flowing in the target circuit in the first driving mode. The controller can execute the second driving mode on a predetermined condition when an accumulated temperature value of the current sensor in the first driving mode has exceeded a threshold, and subsequently execute the first driving mode.

BRIEF DESCRIPTION OF THE DRAWINGS

FIG. 7 is a flowchart illustrating a process substituted for the step S130 and the step S140 in FIG. 5 in a second embodiment.

DETAILED DESCRIPTION

A. First Embodiment

A1. Features of a Fuel Cell Vehicle 10

Figure 1:
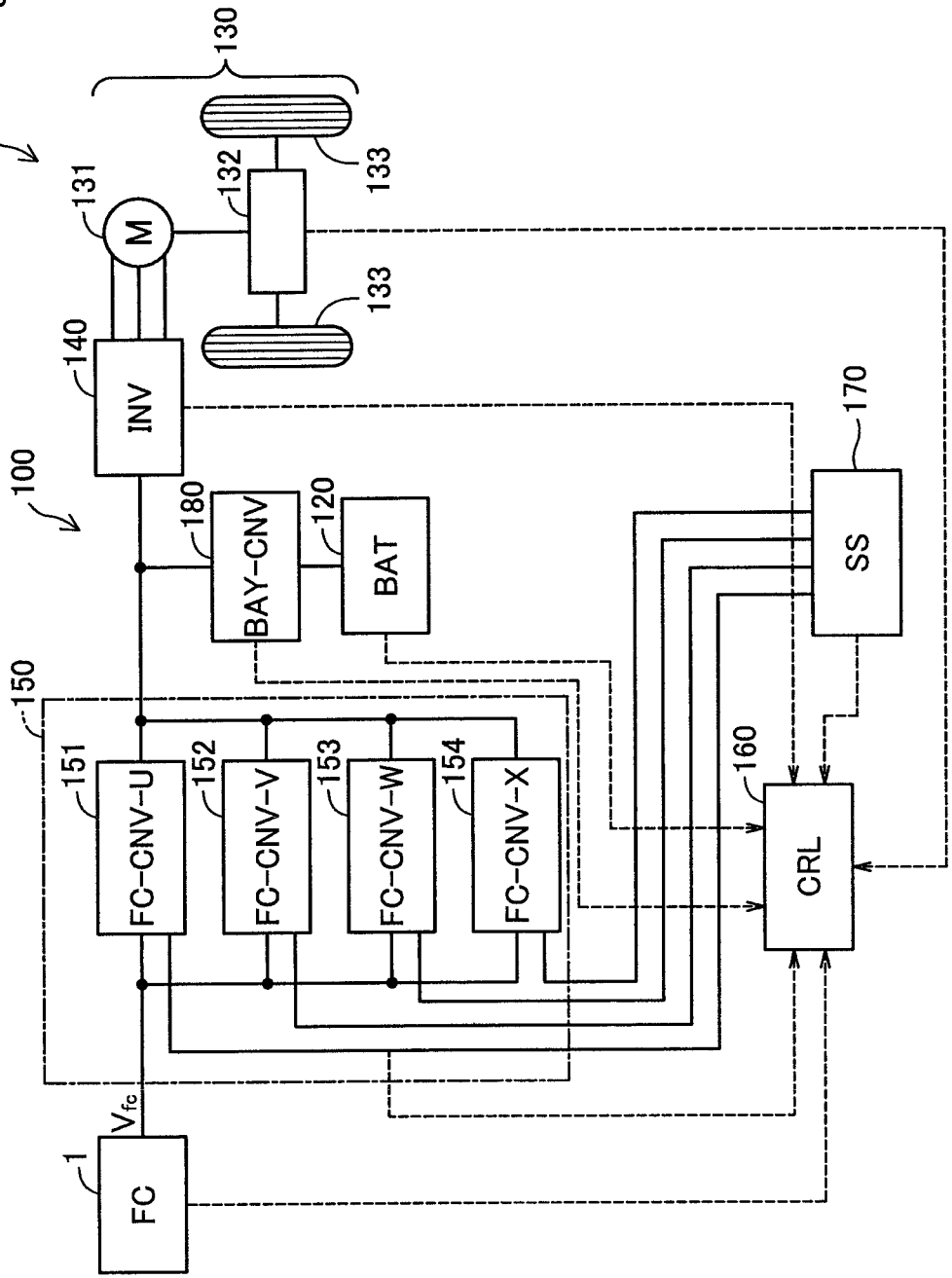
FIG. 1 illustrates a fuel cell vehicle 10 equipped with a fuel cell system 100 according to a first embodiment.

FIG. 1 illustrates a fuel cell vehicle 10 installed with a fuel cell system 100 (FCHV: Fuel Cell Hybrid Vehicle) according to a first embodiment. The fuel cell vehicle 10 comprises a fuel cell system 100, a load 130, an inverter 140, a controller 160, and a series of sensors 170. The fuel cell vehicle 10 is driven by electric power provided mainly by the fuel cell system 100.

The fuel cell system 100 comprises a fuel cell 1, a FC converter 150, a secondary battery 120, and a battery converter 180.

The fuel cell 1 is supplied with hydrogen gas serving as fuel gas and air serving as oxidizing gas to generate electric power and supply it outside. The fuel cell 1 is a polymer electrolyte fuel cell including a cell stack having a plurality of power-generating cells stacked. The fuel cell 1 is represented as "FC1" in FIG. 1.

The FC converter 150 is disposed between the fuel cell 1 and the inverter 140. The FC converter 150 receives output electric power from the fuel cell 1 and converts it into higher voltage and then, supplies it to the inverter 140. The FC converter 150 is a four-phase parallel converter including a U phase 151, a V phase 152, a W phase 153 and an X phase 154 connected to each other in parallel. Detailed features and operations of the FC converter 150 will be described afterwards. The U phase 151, V phase 152, W phase 153 and X phase 154 are respectively represented as "FC-CNV-U151", "FC-CNV-V152", "FC-CNV-W153", and "FC-CNV-X154" in FIG. 1.

The secondary battery 120 is configured to receive and store supplied electric power and supply the electric power to the outside. The secondary battery 120 is a lithium ion battery. The secondary battery 120 is represented as "BAT120" in FIG. 1.

The battery converter 180 is disposed between the secondary battery 120 and the inverter 140. The battery converter 180 receives the output electric power from the secondary battery 120 and converts it into higher voltage or lower voltage and then, supplies it to the inverter 140. In addition, the battery converter 180 receives output electric power from the inverter 140 and converts it into higher voltage or lower voltage and then, supplies it to the secondary battery 120. The FC converter 150 and the fuel cell 1; and the battery converter 180 and the secondary battery 120; are connected to the inverter 140 in parallel. The battery converter 180 is represented as "BAY-CNV180" in FIG. 1.

The load 130 includes all devices and apparatus operated by the electric power supplied from the fuel cell 1 and the secondary battery 120 in the fuel cell vehicle 10. As an example of the load, a traction motor 131 is shown in FIG. 1. The traction motor 131 is supplied with the electric power by the inverter 140 and outputs revolving power. The revolving power from the traction motor 131 is transmitted to tires 133 via a differential gear 132 so as to move the fuel cell vehicle 10.

The traction motor 131 functions as a generator and supplies regenerative electric power to the inverter 140 when the fuel cell vehicle 10 slows down. The regenerative electric power is stored in the secondary battery 120 via the inverter 140 and the battery converter 180.

The inverter 140 converts direct-current power supplied by the fuel cell 1 or the secondary battery 120 into three-phase alternating-current power so as to supply it to the traction motor 131. The inverter 140 is a PWM inverter driven by a pulse-width modulation. The inverter 140 is represented as "INV140" in FIG. 1.

The series of sensors 170 includes sensors provided to the devices and apparatus constituting the fuel cell vehicle 10. The series of sensors 170 provides the controller 160 with signals representing such as opening degree of an accelerator, vehicle speed, output current from the fuel cell 1, and voltage of an output terminal of the fuel cell 1. The series of sensors 170 is represented as "SS170" in FIG. 1.

The controller 160 is a computer system including a CPU, a RAM, and a ROM. The controller 160 controls each part of the fuel cell system 100 such as the fuel cell 1, the FC converter 150, and the battery converter 180. The controller 160 is represented as "CRL160" in FIG. 1.

The controller 160, for example, calculates an amount of electric power required for the load 130, that is, an amount of electric power to be supplied by the fuel cell system 100 to the load 130, based on the various signals from the series of sensors 170. The controller 160 decides an amount to be output from the fuel cell 1 and an amount to be output from the secondary battery 120 in a total amount of the electric power to be supplied by the fuel cell system 100. The controller 160 controls the FC converter 150 and the battery converter 180 so that both the fuel cell 1 and the secondary battery 120 can supply the assigned electric power. Furthermore, the controller 160 outputs a command value to the inverter 140 so as to obtain objective torque corresponding to the opening degree of the accelerator detected by an opening degree sensor of the accelerator in the series of sensors 170 and controls the output torque and revolution speed of the traction motor 131.

Figure 2:
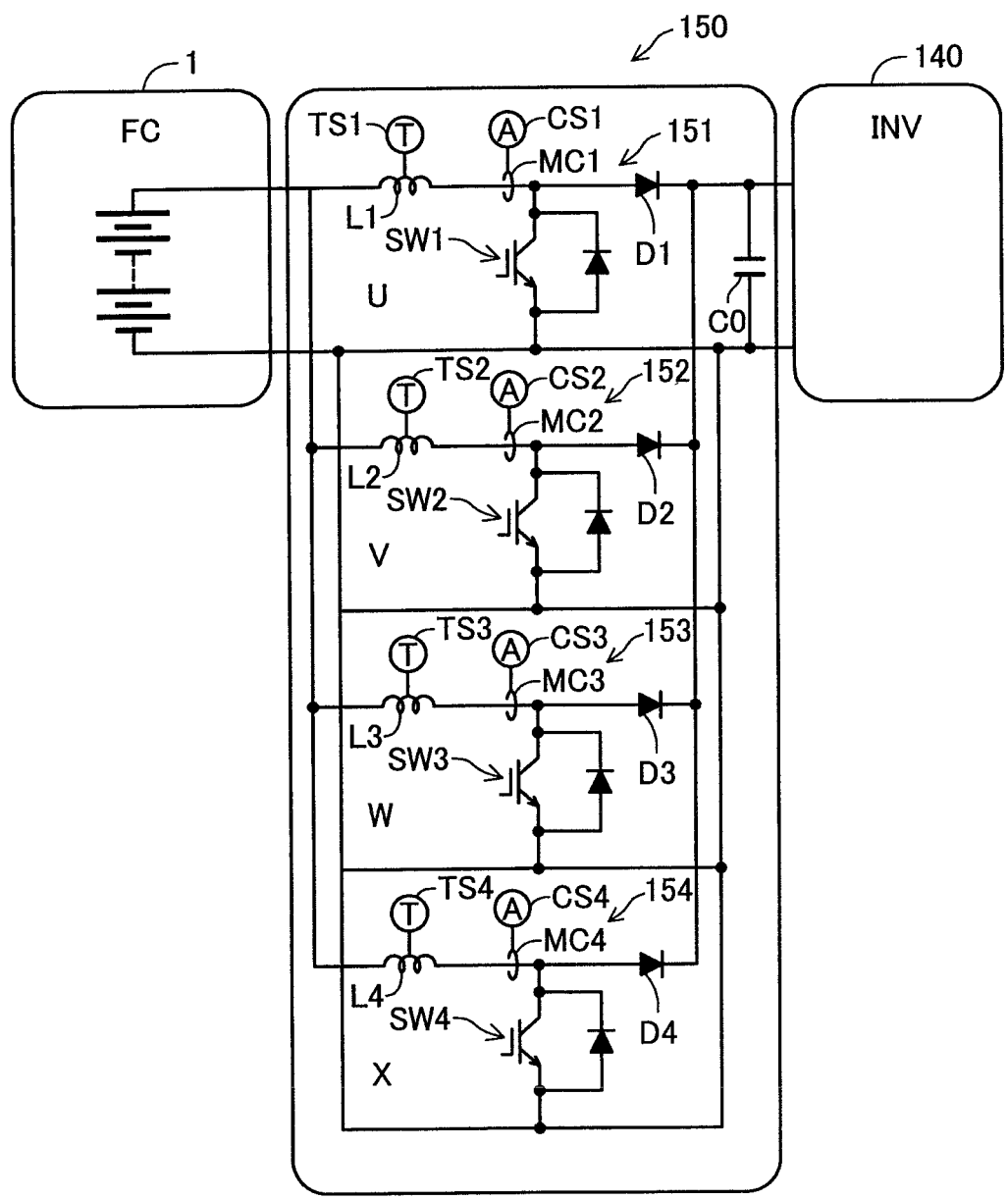
FIG. 2 is a block diagram illustrating a detailed configuration of a FC converter 150.

A2. Features and Operations of the FC Converter:

FIG. 2 represents a block diagram illustrating the detailed features of the FC converter 150. A circuit of the U phase 151 will be hereinafter described as an example out of the plurality of the circuits forming the U phase 151, V phase 152, W phase 153 and X phase 154 provided in the FC converter 150.

The U phase 151 comprises a reactor L1, a diode D1 for rectification, and a switching element SW1. The U phase 151 is equipped with a temperature sensor TS1 and a current sensor CS1.

The reactor L1 is connected to a power supply line of the fuel cell 1. The diode D1 for rectification is connected to the reactor L1 in series. The power supply line of the fuel cell 1 is connected to the inverter 140 via the reactor L1 and the diode D1 for rectification. On the other hand, an earth line of the fuel cell 1 is connected to the inverter 140.

The switching element SW1 includes an insulated gate bipolar transistor (IGBT). A collector of the switching element SW1 is arranged between the reactor L1 and the diode D1 and connected to the power supply line of the fuel cell 1. An emitter of the switching element SW1 is connected to the earth line of the fuel cell 1.

The temperature sensor TS1 measures temperature of the reactor L1 and emits a signal representing the measured temperature to the controller 160. The current sensor CS1 measures the current flowing between the reactor L1 and the diode D1 and emits a signal representing a measured current value to the controller 160. In other words, the current sensor CS1 measures the current flowing in a circuit connecting the circuit of the U phase 151 and the fuel cell 1. The current sensor CS1 is a current sensor of a Hall element type including a magnetic core MC1. The magnetic core MC1 of the current sensor CS1 has been preliminarily magnetized.

Each circuit of the V phase 152, W phase 153 and X phase 154 provided in the FC converter 150 has the same configuration as the configuration of the circuit of the U phase 151. FIG. 2 shows the reactors L2, L3 and L4, the diodes D2, D3 and D4, and the switching elements SW2, SW3 and SW4 respectively disposed in the circuits of the V phase 152, W phase 153 and X phase 154. Moreover, each circuit of the V phase 152, W phase 153 and X phase 154 is provided with the current sensor and the temperature sensor as the circuit of the U phase 151. FIG. 2 shows the current sensors CS2, CS3 and CS4, and the temperature sensors TS2, TS3 and TS4 provided on the circuits of the V phase 152, W phase 153 and X phase 154, other than those of the U phase 151.

The current sensors CS1 to CS4 and the temperature sensors TS1 to TS4 are included in the series of sensors 170. Lines connecting the series of sensors 170 and the U phase 151, V phase 152, W phase 153 and X phase 154 in FIG. 1 illustrates that the current sensors CS1 to CS4 and the temperature sensors TS1 to TS4 are included in the series of sensors 170.

The FC converter 150 further includes a condenser C0. One terminal of the condenser C0 is connected to the power supply line of the fuel cell 1 at a point between each of the circuits of the U phase 151, V phase 152, W phase 153 and X phase 154 connected in parallel to each other and the inverter 140. The other terminal of the condenser C0 is connected to the earth line of the fuel cell 1.

For example, when the switching element SW1 is put in a state of ON in the U phase 151, the current flows to the switching element SW1 from the fuel cell 1 through the reactor L1. The reactor L1 is excited at this time so as to store magnetized energy. Then, when the switching element SW1 is put in a state of OFF, induced voltage generated by the magnetized energy stored in the reactor L1 is superposed on output voltage of the fuel cell 1 in the power supply line. As the switching element SW1 is OFF, the current flows to the inverter 140 via the diode D1.

The controller 160 (see FIG. 1) adjusts a duty ratio between the ON and OFF states of the switching element SW1 so as to control the output voltage of the FC converter 150. The controller 160 also control the switching elements SW2, SW3 and SW4 of the V phase 152, W phase 153 and X phase 154 in the same manner.

Figure 3:
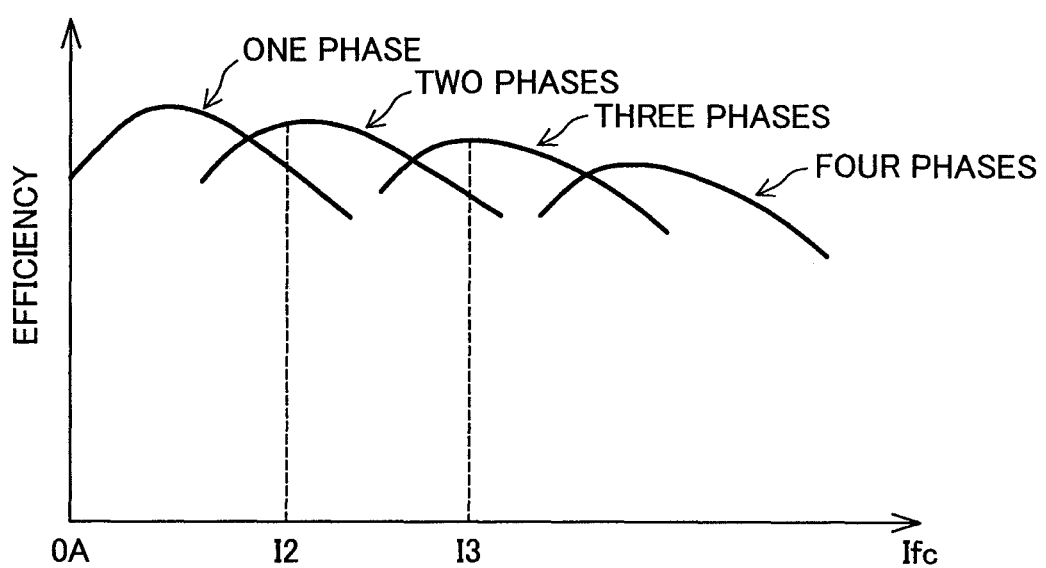
FIG. 3 is a graph illustrating conversion efficiency of the FC converter 150 according to the number of circuits to be used out of four circuits of a U phase 151, V phase 152, W phase 153 and X phase 154 included in the FC converter 150.

FIG. 3 is a graph illustrating conversion efficiency of the FC converter 150 corresponding to the number of circuits to be used out of the four circuits of the U phase 151, V phase 152, W phase 153 and X phase 154 included in the FC converter 150. A horizontal axis of the graph in FIG. 3 represents the output current Ifc from the fuel cell 1. A vertical axis of the graph in FIG. 3 represents the conversion efficiency of voltage conversion by the FC converter 150. In order to facilitate an understanding of the technology, part of curved lines showing lower efficiency are not shown in the graph of the conversion efficiency of the FC converter 150 according the number of circuits to be used. As understood from FIG. 3, when the output current Ifc from the fuel cell 1 gets smaller and the number of circuits to be used in the FC converter 150 gets smaller, the conversion efficiency gets higher.

For example, when the output current Ifc from the fuel cell 1 is I3, the voltage conversion with the highest conversion efficiency is achieved using three circuits out of the circuits of the U phase 151, V phase 152, W phase 153 and X phase 154 compared with the cases using different number of circuits. On the other hand, when the output current from the fuel cell 1 is I2 (I2<I3), the voltage conversion with the highest conversion efficiency is achieved using two circuits out of the circuits of the U phase 151, V phase 152, W phase 153 and X phase 154 compared with the cases using different number of circuits.

Therefore, the controller 160 changes the number of circuits to be used for the voltage conversion out of the four circuits of the U phase 151, V phase 152, W phase 153 and X phase 154 included in the FC converter 150 according to the magnitude of the output current Ifc of the fuel cell 1. Due to this process, it is possible to convert the output voltage of the fuel cell 1 with high efficiency even if the output current Ifc from the fuel cell 1 varies.

Furthermore, when the circuits to be used in the voltage conversion is fewer than the maximum number of the circuits, a priority order of the circuits to be used may be fixed. For example, the U phase 151 may be always used when one circuit of one phase is to be used, the U phase 151 and V phase 152 may be always used when two circuits of two phases are to be used, and the U phase 151, V phase 152 and W phase 153 may be always used when three circuits of three phases are to be used. On the other hand, the priority order of the circuit to be used may be shifted. For example, the order of the circuit to be used in a case of the voltage conversion with one circuit of one phase may be shifted in a sequence order of the U phase 151, V phase 152, W phase 153 and X phase 154.

A3. Magnetization of the Magnetic Core of the Current Sensor

The current sensors CS1 to CS4 (see FIG. 2) of the Hall element type include the magnetic cores MC1 to MC4, each of which being ring-shaped and disposed to circle the target circuit of the current measurement. The ring-shaped magnetic cores MC1 to MC4 include gaps breaking the rings. In the gaps, Hall elements are disposed. If the current flows in the target circuits of the current measurement, magnetic fields are generated around the current. The magnetic fields make magnetic fluxes pass through the Hall elements constituting the part of the ring-shaped magnetic cores MC1 to MC4 so as to generate Hall voltage. The Hall voltage varies depending on the amount of current flowing in the target circuit of the current measurement. Amplified voltage of the generated Hall voltage is a signal from each of the current sensors CS1 to CS4.

In a state where the magnetic core is not magnetized at all, a value of the Hall voltage rises from zero in accordance with an increase in an amount of the current flowing in the target circuit of the current measurement from zero. However, once the magnetic core is exposed to the magnetic field generated by the current, the value of the Hall voltage will not return to zero even if the amount of the current flowing in the target circuit of the current measurement returns to zero. This is because the magnetic core is fixedly magnetized by the magnetic field. A degree to which the magnetic core is fixedly magnetized depends on the maximum value of the current applied to the target circuit of the current measurement.

Figure 4:
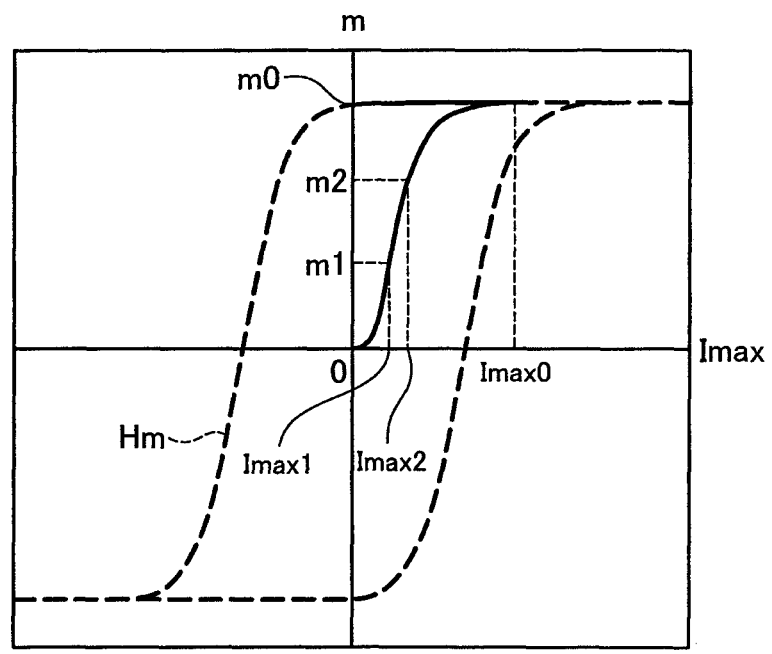
FIG. 4 is a graph illustrating a relation between a degree of fixed magnetization of a magnetic core of a current sensor of a Hall element type and a maximum value of current flowing in a target circuit of current measurement.

FIG. 4 is a graph illustrating a relation between the degree of the fixed magnetization of the magnetic core of the current sensor of the Hall element type (see CS1 to CS4 in FIG. 2) and the maximum value of the current flowing in the target circuit of the current measurement. A horizontal axis of the graph in FIG. 4 represents the maximum value Imax of the amount of the current flowing in the target circuit of the current measurement by the current sensor. A vertical axis of the graph in FIG. 4 represents the degree of the magnetization of the magnetic core left when the amount of the current returns zero after the current flows in the target circuit of the current measurement by the current sensor. The curved line of the graph in FIG. 4 corresponds to J-H curve.

For example, when the current flows in the target circuit of the current measurement and the maximum current value is Imax1, the degree of the magnetization of the magnetic core is m1. Furthermore, when the current flows in the target circuit of the current measurement and the maximum current value is Imax2 that is higher than Imax1, the degree of the magnetization of the magnetic core is m2 that is higher than m1. On the other hand, the degree of the magnetization of the magnetic core m1 does not vary even if the current of the maximum value Imax1 flows in the circuit, subsequently, the current value drops to zero and then, the current of the maximum value lower than Imax1 flows in the circuit.

When the current measurement is started from the state where the magnetic core of the current sensor is not magnetized, the degree of the magnetization of the magnetic core becomes larger every time when the maximum current value in the target circuit of the current measurement gets higher than the previous maximum value. Therefore, even if the current value as a measured value is decided based on the Hall voltage generated depending on the current, it is not possible to accurately decide the current value because the value generated by the fixed magnetization (residual magnetization) of the magnetic core in the measured value is unknown.

Note that the degree of the magnetization of the magnetic core can be reduced by applying the current in a reverse direction relative to the direction at the time of the measurement to the target circuit of the current measurement. However, that process cannot be performed because the current flows only in the direction from the fuel cell 1 to the inverter 140 in the power supply line connecting the fuel cell 1 and the inverter 140 (see D1 to D4 in FIG. 2). Moreover, even if such a process can be hypothetically performed, the degree of the magnetization of the magnetic core has hysteresis to the current flowing the target circuit of the current measurement (see Hm shown with broken lines in FIG. 4).

Therefore, when the degree of the magnetization just before the reverse current application is uncertain, the degree of the magnetization of the magnetic core cannot be reduced to an objective degree of the magnetization, that is, zero, even if the current in the reverse direction is applied.

In this embodiment, before putting the current sensors CS1 to CS4 in operation, the current of the current value Imax0 that exceeds a maximum current value to be expected in each of the target circuits of the current measurement is applied to each of the circuits so as to magnetize the magnetic cores MC1 to MC4 to the degree of m0. The current value Imax0 can be, for example, the maximum current value allowed to flow in the reactors L1 to L4 as defined in a specification of the reactors L1 to L4. This process is herein also referred to as "preliminary magnetization".

Due to this kind of process, the degrees of the magnetizations of the magnetic cores MC1 to MC4 do not vary according to variations of the maximum current values of the current in the circuits during the operation of the current sensors CS1 to CS4. As a result, the values generated by the fixed magnetization of the magnetic cores MC1 to MC4 in the measured current values are invariable. If the values generated by the fixed magnetization of the magnetic cores MC1 to MC4 in the measured current values have been measured in advance, accurate current values can be obtained by subtracting the values depending on the fixed magnetizations from the measured current values obtained during the operation of the current sensors CS1 to CS4. The amount of the current to be subtracted from the measured value is measured in advance so that the current sensor can subtract the previously measured value and define the remaining amount as the measured value. This calibration process is referred to as "origin point learning".

In this embodiment, the magnetic cores MC1 to MC4 of the current sensors CS1 to CS4 have been preliminarily magnetized with the current of the current value Imax0 that is over the expected maximum current value. Therefore, the inaccuracy of the current sensors can be effectively reduced by the calibration of the current sensors.

However, the degrees of the fixed magnetization of the magnetic cores MC1 to MC4 may decrease for some reason. This phenomenon is also referred to as "demagnetization". If the degrees of the fixed magnetization of the magnetic cores MC1 to MC4 decrease, the amounts to be subtracted from the measured values also vary, more specifically, decrease, which makes it impossible to obtain accurate current values from the output voltage of the current sensors. Consequently, in the case in which the process of the origin point learning is defined on a premise that the magnetic cores have been magnetized with the current of the value Imax0, accurate calibration cannot be performed by learning the original point at some point after the fuel cell system 100 is put in operation, for example, at a time point when the current is zero.

Moreover, if a large amount of current flow in the target circuits of the current measurement after the demagnetization, the degrees of the fixed magnetization of the magnetic cores MC1 to MC4 increase again. Thus, even if the origin point learning is performed after the demagnetization, the accurate current values cannot be obtained subsequently.

Accordingly, in addition to the process to preliminarily magnetize the magnetic cores MC1 to MC4 up to m0 by applying the current of the current value Imax0 that exceeds the expected maximum current value before the current sensors CS1 to CS4 are put in operation, it is preferable to perform the same process after the operations are started.

Inventors of the disclosed technology have found out that a factor decreasing the degrees of the fixed magnetization of the magnetic cores is that the temperature of the magnetic cores of the current sensors becomes repeatedly high.

Figure 5:
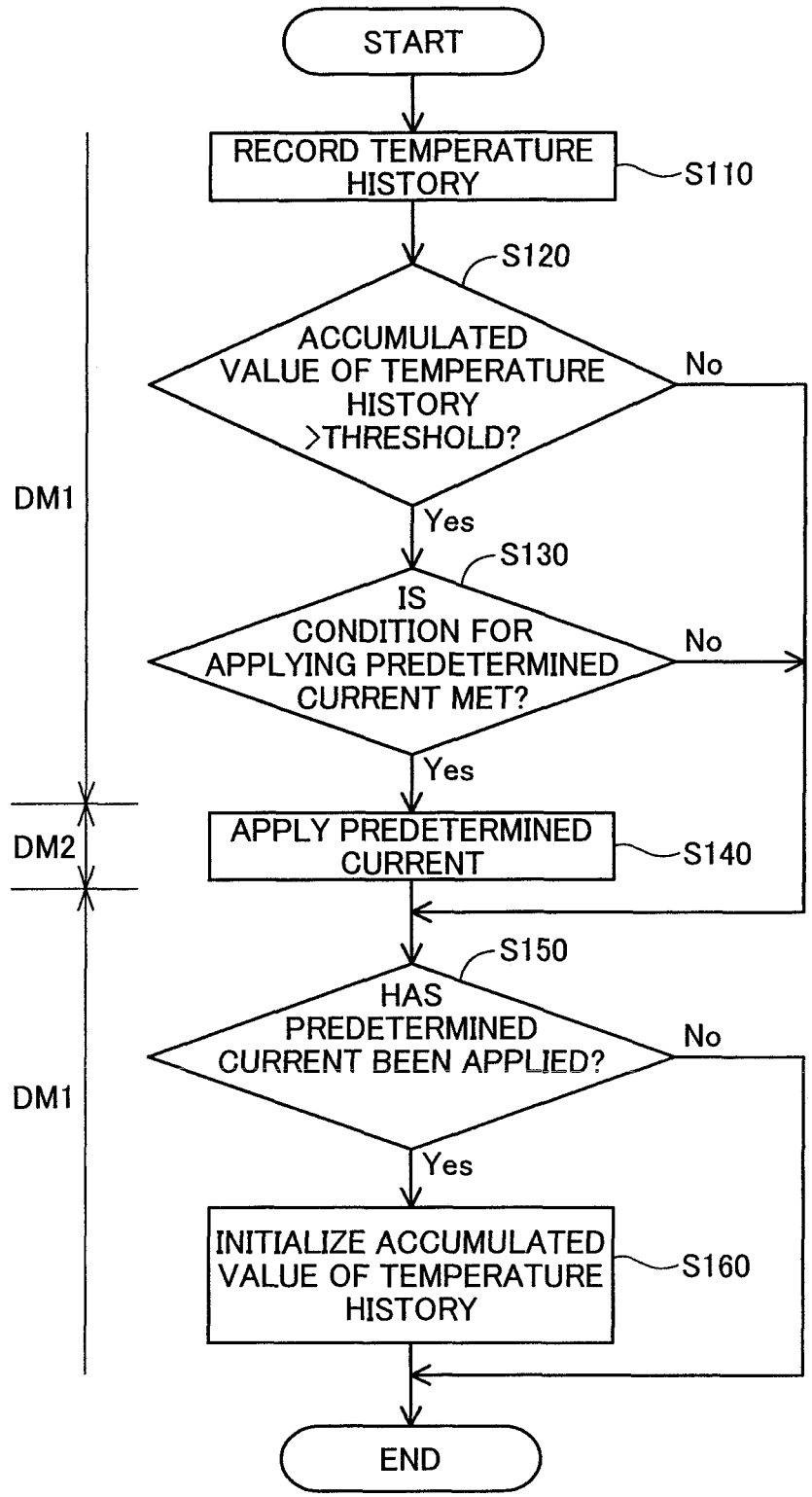
FIG. 5 is a flowchart illustrating a process to magnetize magnetic cores MC1 to MC4 after current sensors CS1 to CS4 are put in operation.

A4. The Magnetization of the Magnetic Core of the Current Sensor after the Operation is Started FIG. 5 is a flowchart illustrating a process to magnetize the magnetic cores MC1 to MC4 after the current sensors CS1 to CS4 are put in operation. The process shown in FIG. 5 is repeatedly performed by the controller 160 on each of the circuits of the U phase 151, V phase 152, W phase 153 and X phase 154 (see FIG. 1 and FIG. 2) during the operation of the fuel cell system 100 after the fuel cell vehicle 10 is shipped from a manufacturing factory. Contents of the technology are described hereinafter in reference to a case of the U phase 151 as an example.

In a step S110 in FIG. 5, the controller 160 records a temperature history of the current sensor CS1 on the RAM, more specifically, on a nonvolatile memory. More specifically, the controller 160 records the temperature of the reactor L1 whose current the current sensor CS1 measures at every predetermined time period, for example, at every 10 seconds. The temperature of the reactor L1 is obtained by the temperature sensor TS1 (see FIG. 2).

In a step S120, the controller 160 determines whether an accumulated temperature value of the reactor L1 recorded on the RAM exceeds a threshold. More specifically, the controller 160 determines whether sum of the temperature of the reactor L1 at each time recorded on the RAM exceeds a predefined threshold ITth. The threshold ITth is set at a total value expecting the generation of the deviation over an acceptable value in the measured value of the current sensor CS1 if the current sensor CS1 is repeatedly exposed to the high temperature up to that value (more specifically, temperature and the number of times or length of time). The threshold ITth can be obtained by experiment in advance. If an accumulated temperature value IT exceeds the threshold ITth, the process proceeds to a step S130. If the accumulated temperature value IT does not exceed the threshold ITth, the process proceeds to a step S150.

In the step S130, the controller 160 determines whether a condition that the current equal to or higher than the current value Imax0 (hereinafter also referred to as "predetermined current") can be applied in the power supply line of the U phase 151 while suppling the load 130 with the electric power required for the load 130 is met. More specifically, as a subordinate condition, for example, the controller 160 determines whether the current value required from the fuel cell system 100 is a value to apply the predetermined current to the power supply line of the U phase 151 when the voltage conversion is performed using the number of circuits to maximize the conversion efficiency of the voltage (see FIG. 3). If the conditions are met, the process proceeds to a step S140. If the conditions are not met, the process proceeds to a step S150.

In a step S140, the controller 160 executes a processing of applying the predetermined current to the power supply line of the U phase 151. This processing is performed for one second, for instance.

A driving mode of the fuel cell system 100 in the step S140 is referred to as "second driving mode DM2". On the contrary, a driving mode of the fuel cell system 100 in the steps except for the step S140 is referred to as "first driving mode DM1". That is, the controller 160 has the "first driving mode DM1" and the "second driving mode DM2" as the driving modes of the fuel cell system 100. Detailed description of the first driving mode DM1 and the second driving mode DM2 will be given later.

By performing the processing according to the steps S110 to S140, the second driving mode is executed on condition that the accumulated temperature value IT of the current sensor CS1 has exceeded the threshold ITth, the generation of the deviation in the measured value of the current sensor CS1 is expected and a determination of the step S130 is Yes. As a result, the current equal to or higher than the current value Imax0 flows in the power supply line of the U phase 151 so as to magnetize the magnetic core MC1 of the current sensor CS1 as the preliminary magnetization before the current sensor CS1 is put in operation. Consequently, the deviation in the measured value of the current sensor CS1 becomes invariable in the subsequent operation of the fuel cell system 100. Thus, the accurate measured current value can be obtained using the measured value of the current sensor CS1 while compensating an amount of deviation in the subsequent operation of the fuel cell system 100. That is, the accurate measured current value excluding an effect of the demagnetization of the magnetic core MC1 can be obtained.

In a step S150, the controller 160 determines whether the predetermined current has been applied to the power supply line of the U phase 151. This determination can be made based on the value of the electric power that the fuel cell system 100 should supply and operation states of the U phase 151, V phase 152, W phase 153 and X phase 154 of the FC converter 150. This determination can be made based on, for example, whether the current value measured by the current sensor CS1 has exceeded a threshold. The threshold of the current in this regard is set higher than a theological value estimated without the deviation in view of an estimated value of the deviation in the current value due to the demagnetization of the magnetic core MC1. If the determination in the step S150 is Yes, the process proceeds to a step S160. If the determination in the step S150 is No, the process is terminated.

In the step S160, the controller 160 initializes the temperature history of the current sensor CS1. More specifically, the controller 160 sets all the measured temperature values of the reactor L1 recorded on the RAM to zero. Due to this processing, the controller 160 can determine whether the accumulated temperature value IT of the reactor L1 recorded on the RAM has exceeded the threshold ITth in the step S120 so as to determine whether the generation of the deviation is expected in the measured value of the current sensor CS1 in the next execution of the process shown in the flowchart in FIG. 5.

Furthermore, in the step S160, the controller 160 performs the origin point learning of the current sensor CS1. More specifically, the controller 160 stores the value of the output signal of the current sensor CS1 when the fuel cell system 100 is controlled to apply no current to the power supply line of the U phase 151 as the value representing zero current on the RAM. In the subsequent process, the controller 160 processes the measured current value of the current sensor CS1 in light of the signal value representing the zero current stored on the RAM. The process is terminated after the step S160.

The controller 160 repeatedly executes the process shown in FIG. 5 to the circuits of the U phase 151, V phase 152, W phase 153 and X phase 154. In the case in which the accumulated temperature value of the reactor has exceeded the threshold in only one circuit, a current application processing of the step S140 may be performed only on that circuit. In the case in which the accumulated temperature values of the reactors have exceeded the threshold in two or more circuits at the same time, the current application processing of the step S140 can be performed on those two or more circuits simultaneously.

Meanwhile, as to any of the circuits that is not used for boosting the voltage by the FC converter 150 in the four circuits of the U phase 151, V phase 152, W phase 153 and X phase 154 (see FIG. 3), only the processing of the step S110 shown in FIG. 5 is performed. If the circuit is later put to use to the boosting of the voltage by the FC converter 150, the whole process of the flowchart shown in FIG. 5 is performed.

A5. The First Driving Mode and the Second Driving Mode

A control method for implementing the first driving mode DM1 and the second driving mode DM2 (see FIG. 5) is described hereinafter. Note that the details of the control by the controller 160 is described in reference to the U phase 151 as an example. The control of the V phase 152, W phase 153 and X phase 154 is also performed by the controller 160 in the same manner.

In the first driving mode DM1 of the fuel cell system 100, the maximum current value in the target circuit of the current measurement is set lower than the value of the current Imax0 (see FIG. 4) used for the preliminary magnetization of the magnetic core of the current sensor. On the other hand, in a second driving mode DM2, the maximum current value in the target circuit of the current measurement is set higher than the maximum current value in the target circuit of the current measurement in the first driving mode DM1. More specifically, in the second driving mode DM2, the maximum current value in the target circuit of the current measurement is set equal to or higher than Imax0.

Figure 6:
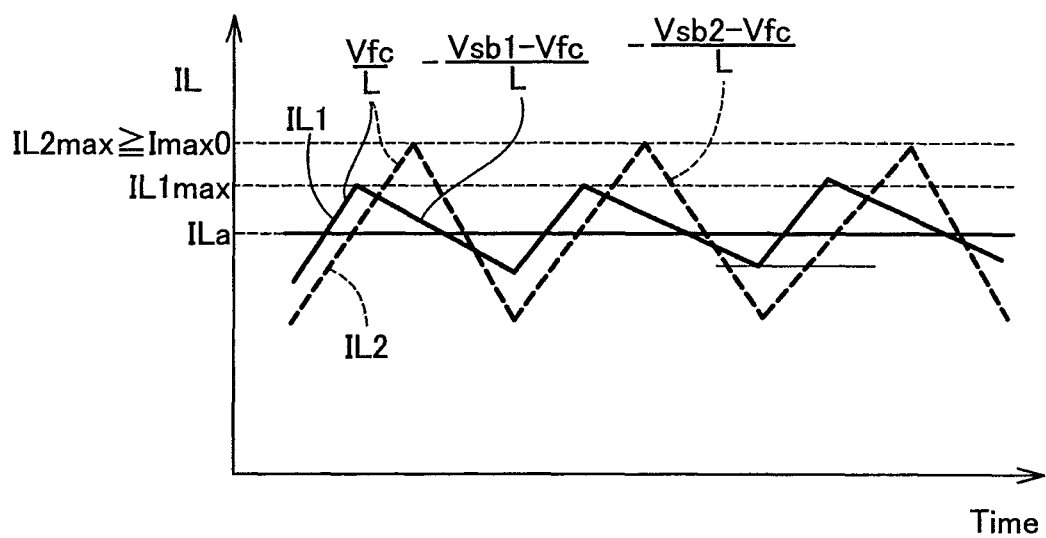
FIG. 6 is a graph illustrating current IL1 of a reactor L1 in a first driving mode DM1 and current IL2 of a reactor L1 in a second driving mode DM2.

FIG. 6 is a graph illustrating the current IL1 of the reactor L1 in the first driving mode DM1 and the current IL2 of the reactor L1 in the second driving mode DM2. Note that the required electric power for the load 130, that is, the electric power that the fuel cell system 100 should supply to the load 130 is supposed to be equal.

In the first driving mode DM1, when the switching element SW1 is ON, the current flows from the reactor L1 on the power supply line toward the earth line via the switching element SW1 (see FIG. 2). Resistance in this circuit is approximately zero. The current IL1 flowing in the reactor L1 linearly increases at this time. Suppose that inductance of the reactor L1 is L, a gradient of the current IL1 flowing in the reactor L1 is represented by Vfc/L.

In the first driving mode DM1, when the switching element SW1 is OFF, the current flows from the reactor L1 toward the inverter 140 via the diode D1 (see FIG. 2). Note that the power supply line and the earth line are not connected as the switching element SW1 is OFF. The current IL1 flowing in the reactor L1 linearly decreases at this time. Suppose that the voltage on an input side of the inverter 140 in the first driving mode DM1, that is, the output voltage of the FC converter 150 is Vsb1, the gradient of the current IL1 flowing in the reactor L1 is represented by $-(Vsb1-Vfc)/L$. Note that the output voltage of the FC converter 150 (Vsb1 in the first driving mode DM1) is the output voltage of the battery converter 180 connected to the inverter 140 in parallel to the FC converter 150. Thus, the output voltage of the FC converter 150, that is, the output voltage of the battery converter 180 is controlled by the battery converter 180.

The current IL2 flowing in the reactor L1 also linearly increases in the second driving mode DM2 when the switching element SW1 is ON. The gradient of the current IL2 flowing in the reactor L1 is represented by Vfc/L, as in the case of the first driving mode DM1.

The current IL2 flowing in the reactor L1 also linearly decreases in the second driving mode DM2 when the switching element SW1 is OFF. Suppose that the voltage on the input side of the inverter 140 in the second driving mode DM2, that is, the output voltage of the FC converter 150 is Vsb2, the gradient of the current IL2 flowing in the reactor L1 is represented by −(Vsb2−Vfc)/L. Vsb2 is set higher than Vsb1 in the second driving mode DM2. Therefore, the negative gradient of the current IL2 when the switching element SW1 is OFF in the second driving mode DM2 is steeper than the negative gradient of the current IL1 when the switching element SW1 is OFF in the first driving mode DM1.

The controller 160 controls the output voltage of the battery converter 180, that is, the output voltage of the FC converter 150 via the battery converter 180 so that the maximum value IL2max of the current IL2 flowing in the reactor L1 will be equal to or higher than Imax0 in the second driving mode DM2. That is, the output voltage Vsb2 from the FC converter 150 in the second driving mode DM2 is set higher than the output voltage Vsb1 of the FC converter 150 in the first driving mode DM1. As a result, the magnetic core MC1 of the current sensor CS1 is magnetized by the current equal to or higher than Imax0 flowing in the reactor L1 to the extent that the degree of the magnetization does not vary in the first driving mode DM1 (see FIG. 4).

Note that frequency of the current ripple in the first driving mode DM1 and the second driving mode DM2 is several thousand to tens of thousand Hz (see FIG. 6). Accordingly, the current equal to or higher than the current value of Imax0 flows in the target circuit for a period of time and at the number of times enough for the magnetization in the second driving mode DM2 (i.e., the step S140 in FIG. 5).

On the other hand, in the first driving mode DM1, the controller 160 and the battery converter 180 control the output voltage of the FC converter 150 so that the maximum value IL1max of the current IL1 flowing in the reactor L1 will be smaller than Imax0. As a result, the degree of the magnetization of the magnetic core MC1 of the current sensor CS1 does not vary by the current flowing in the reactor L1 in the first driving mode DM1 (see FIG. 4).

Note that an average value of the current IL1 flowing in the reactor L1 in the first driving mode DM1 and an average value of the current IL2 flowing in the reactor L1 in the second driving mode DM2 are equal and represented as ILa. Therefore, the electric power supplied to the inverter 140 from the fuel cell 1 does not vary. The controller 160 controls the FC converter 150 and the battery converter 180 to enable such driving operations. Thus, it is not necessary to increase or decrease the electric power to be supplied to the load 130 by the fuel cell system 100 according to the electric power required for the load 130. In other words, the electric power equal to the required electric power for the load 130 may be supplied from the fuel cell system 100 and the secondary battery 120 to the load 130. On the other hand, as described above, the maximum current value IL2max in the target circuit of the current measurement in the second driving mode DM2 is set higher than the maximum current value IL1max in the first driving mode DM1 so as to magnetize the magnetic core MC1.

In addition, there may be a circuit in the four circuits of the U phase 151, V phase 152, W phase 153 and X phase 154 to which the processing of the step S140 shown in FIG. 5 (see FIG. 6) is performed when the accumulated temperature value IT of the reactor in another circuit has exceeded the threshold ITth, though the accumulated temperature value IT of its own reactor has not exceeded the threshold ITth. If the processing of the step S140 shown in FIG. 5 is performed to such a circuit, the following process including the step S150 is also performed to the circuit.

Note that the FC converter 150 in this embodiment is also referred to just as "converter". The condition that the determination of the step S130 is Yes in this embodiment is referred to as "predetermined condition" for executing the second driving mode.

B. Second Embodiment

In the first embodiment, the number of circuits to be used for the voltage conversion is decided by the controller 160 in the first driving mode DM1 and the second driving mode DM2 so as to maximize the conversion efficiency (see FIG. 3). However, in the second driving mode DM2 in the second embodiment, the number of circuits to be used for the voltage conversion is decided based on a principle different from a principle shown in FIG. 3. Moreover, the details of the current application processing with the predetermined current (see the step S140 in FIG. 5) in the second embodiment is also different from the details of the first embodiment. Other configurations in the second embodiment are the same as the configurations in the first embodiment.

FIG. 7 is a flowchart illustrating a process substituted for the step S130 and the step S140 in FIG. 5 according to the second embodiment. Processing of a step S131 and a step S141 shown in FIG. 7 are performed in the second embodiment in place of the step S130 and the step S140 in FIG. 5. The process in the second embodiment except for the processing of the magnetization of the magnetic cores MC1 to MC4 after the current sensors CS1 to CS4 are put in operation is the same as the process in FIG. 5.

The controller 160 processes steps S132 to S138 in the step S131. The controller 160 temporarily decides the number of circuits to be used out of the four circuits of the U phase 151, V phase 152, W phase 153, and X phase 154 so as to maximize the conversion efficiency in the step S132.

In the step S134, the controller 160 determines whether the maximum current value in the circuit to be used can be controlled to be equal to or higher than the current value Imax0 used for the preliminary magnetization.

If the determination in the step S134 is Yes, the process proceeds to the step S141. The case in which the determination is Yes in the step S134 is the case in which the condition that the predetermined current can be applied to the power supply line of the U phase 151 is met; that is, it corresponds to the case in which the determination of the step S130 in FIG. 5 is "Yes". Therefore, the case in which the determination of the step S134 is Yes can be considered as the case in which the determination of the whole step S131 in FIG. 7 is "Yes".

On the other hand, if the determination in the step S134 is No, the process proceeds to a step S136.

The controller 160 reduces the number of circuits to be used for the voltage conversion by one in the step S136. By reducing the number of circuits to be used for the voltage conversion, the amount of current flowing in the circuit to be used for voltage conversion can be increased (see the step S134).

The controller 160 determines whether the number of circuits to be used is one or more in the step S138. If the number of circuits to be used is one or more, the process returns back to the step S134.

If the number of circuits to be used is smaller than one, i.e., none in the step S138, the process proceeds to the step S150. The case in which the number of circuits to be used is zero in the step S138 is the case in which the condition that the predetermined current can be applied to the power supply line of the U phase 151 is not met; that is, it corresponds to the case in which the determination of the step S130 in FIG. 5 is "No". Accordingly, the case in which the determination of the step S138 is No can be considered as the case in which the determination of the whole step S131 in FIG. 7 is "No".

In the step S141, the conversion of the output voltage of the fuel cell 1 is performed using the circuit or the circuits of the number decided in the preceding process up to the step S134 out of the four circuits of the U phase 151, V phase 152, W phase 153 and X phase 154. The maximum value of the output voltage of each of the circuits is controlled to be equal to or higher than the current value Imax0 used for the preliminary magnetization (see FIG. 6). In the preceding process S131, in the case in which the determination of the step S134 is No once or more times, the circuit/circuits fewer than the circuits used in the first driving mode DM1 until then is/are used in the step S141 when compared on the condition that the required electric power is equal. Then, the circuit/circuits fewer than the available largest number of circuits is/are used for the voltage conversion.

The controller 160 can choose the circuit/circuits to be used from the four circuits of the U phase 151, V phase 152, W phase 153 and X phase 154 when the voltage conversion is performed using the circuit/circuits fewer than the circuits used in the first driving mode DM1. As a result, the controller 160 can choose the circuit/circuits out of the four circuits of the U phase 151, V phase 152, W phase 153 and X phase 154 that is/are different from the circuit/circuits used in the previous second driving mode DM2. The priority order of the circuit/circuits to be used for the voltage conversion is not fixed in the case of using the circuit/circuits fewer than the circuits used in the first driving mode DM1 in the second embodiment. The controller 160 chooses the circuit/circuits to be used in the step S141 so as to include the circuit/circuits in which the accumulated temperature value IT of the reactor has exceeded the threshold ITth in the step S120 in FIG. 5.

The controller 160 performs the process shown in FIGS. 5 and 7 to each of the circuits of the U phase 151, V phase 152, W phase 153 and X phase 154. In the case in which the number of circuits in which the accumulated temperature value IT of the reactor has exceeded the threshold ITth (see S120 in FIG. 5) is larger than the number of circuits that should be used for the voltage conversion, the controller 160 preferentially chooses the circuit/circuits in order of the accumulated temperature value IT of the reactor from highest to lowest as the circuit/circuits to be used. Following process is the same as the process in the first embodiment (process after S150 in FIG. 5).

The operation of the fuel cell system 100 when the circuit/circuits fewer than the circuits used in the preceding first driving mode DM1 valve used in the step S141 is the "second driving mode DM2". The driving mode of the fuel cell system 100 except for the step S141 is the "first driving mode DM1".

By restricting the number of circuits to be used as described above, the current the maximum value of which is over the current value Imax0 used for the preliminary magnetization is applied to each of the reactors of the circuits to be used for the voltage conversion. Therefore, the maximum current value in the target circuit in the second driving mode DM2 can be made higher than the maximum current value in the first driving mode DM1 so that the magnetic cores MC1 to MC4 can be magnetized without changing the required electric power from the fuel cell 1 for the purpose of the magnetization of the magnetic cores MC1 to MC4.

Note that the maximum current value in the reactor in the second driving mode DM2 is controlled to be higher than the maximum current value in the reactor in the first driving mode DM1 (see FIG. 6) in the first embodiment. That is, amplitude of the current flowing in the reactor is controlled to be larger than the maximum current value in the reactor in the first driving mode DM1.

On the other hand, the average current value in the reactor in the second driving mode DM2 is controlled to be higher than the current value in the reactor in the first driving mode DM1, when compared on the same condition, in the second embodiment. That is, the amount of whole current flowing in the reactor is controlled to be larger than the amount of the current flowing in the reactor in the first driving mode DM1, when compared on the same condition.

Meanwhile, as to the circuit/circuits that is/are not used for the voltage conversion, the switching elements (SW1 to SW4 in FIG. 2) is/are consistently set OFF in the step S141 in the second driving mode DM2.

C. Other Embodiments

C1. Another Embodiment 1

(1) The current sensor CS1 in the above-described embodiments is the sensor configured to measure the current flowing between the reactor L1 and the diode D1. However, the current sensor provided in the fuel cell system may be a sensor configured to measure the current in another circuit, such as a sensor configured to measure the current between the fuel cell 1 and the reactor L1. That is, the current sensor may be the one configured to measure the current from the fuel cell to the converter configured to convert the output voltage of the fuel cell.

(2) The temperature sensor in the above-described embodiments is the sensor configured to measure the temperature of the reactor L1. However, the temperature sensor may have a different configuration. For example, the temperature sensor may be a sensor configured to measure the temperature of another part; that is, the temperature sensor may measure the temperature of a housing of the converter, refer to a prepared correlation data between the housing temperature and the temperature of the magnetic core of the current sensor and then, obtain the temperature of the current sensor. Furthermore, the temperature sensor may be a sensor configured to directly measure the temperature of the current sensor such as the magnetic core of the current sensor. Further, the temperature sensor may be a sensor configured to estimate the temperature of the current sensor in view of the measured value of the current sensor. In other words, the temperature sensor may be any sensor as long as it can obtain the temperature of the current sensor in some way.

(3) In the above-described embodiments, the magnetic cores MC1 to MC4 of the current sensors CS1 to CS4 have been preliminarily magnetized before the operation of the fuel cell system 100. In this regard, each of the magnetic cores may be magnetized up to a saturation point or lower degree.

(4) In the above-described embodiments, if the determination in the step S150 is Yes, the temperature history of the current sensor is initialized. However, the temperature history of the current sensor may be initialized after the current application processing in the step S140 without the determination process in the step S150. Furthermore, the temperature history of the current sensor may be also initialized when the predetermined current is applied to the target circuit for some reason regardless of the current application processing in the step S140.

(5) The secondary battery 120 in the above-described embodiments is a lithium ion battery. However, beside the lithium ion battery, the secondary battery that can store the electric power generated by the fuel cell and the traction motor functioning as a generator may be a different kind of secondary battery such as a nickel hydrogen battery and lead storage battery.

C2. Another Embodiment 2

In the above-described embodiments, the FC converter 150 is the four-phase parallel converter including the U phase 151, V phase 152, W phase 153 and X phase 154 connected to each other in parallel. However, the converter configured to convert the output voltage of the fuel cell may be the converter including a different number of phases, such as one phase, two phases, three phases, and five phases or more.

C3. Another Embodiment 3

(1) In the above-described second embodiment, in the case in which the number of circuits in which the accumulated temperature value IT of the reactor has exceeded the threshold ITth (see S120 in FIG. 5) is larger than the number of circuits to be used, the circuit is/circuits are preferentially chosen as the circuit/circuits to be used in order of the accumulated temperature value IT of the reactor from highest to lowest. However, the circuit/circuits to be used may be preferentially chosen from the circuits in which the accumulated temperature value IT of the reactor has exceeded the threshold ITth in a sequence order of the U phase 151, V phase 152, W phase 153 and X phase 154. That is, the only thing needed is to decide one or more of the circuits to be used in the second driving mode DM2 out of the circuit/circuits respectively equipped with the current sensor whose accumulated temperature value IT has exceeded the threshold ITth according to the electric power required from the fuel cell 1.

(2) In the above-described embodiments, the reactors L1 to L4 in the phases in the FC converter 150 are respectively equipped with the temperature sensors TS1 to TS4. However, one or more of the circuits in the FC converter may be configured without a temperature sensor. That is, one temperature sensor may be configured to obtain one temperature value representing the circuits of two or more phases. In such a configuration, the temperature sensor may be disposed, for example, between the circuits of the two phases.

C4. Another Embodiment 4

(1) In the above-described first embodiment, the controller 160 and the battery converter 180 control the output voltage of the battery converter 180, i.e., the output voltage of the FC converter 150 so that the maximum value IL2max of the current IL2 flowing in the reactor L1 will be equal to or higher than Imax0 in the second driving mode DM2. On the other hand, the maximum current value in the reactor may be set lower than Imax0 in the second driving mode. However, preferably, the maximum current value in the reactor in the second driving mode is set higher than the maximum current value in the reactor in the first driving mode.

Moreover, preferably, the fuel cell system includes the secondary battery, a first converter configured to convert the output voltage of the fuel cell, and a second converter connected in parallel to the first converter relative to the load and configured to control the output voltage of the secondary battery, and the output voltage of the first converter is controlled by the second converter.

(2) In the second driving mode DM2 in the above-described first embodiment, the output voltage of the FC converter 150 is set higher than the output voltage in the first driving mode DM1 so that the maximum current value in the reactor will be higher than the maximum current value in the reactor in the first driving mode (more specifically, equal to or higher than Imax0). Such a configuration is especially effective in magnetizing the magnetic core of the current sensor in a converter with a single phase.

C5. Another Embodiment 5

In the above-described first embodiment, the second driving mode is executed on the condition that the accumulated temperature value IT of the current sensor CS1 has exceeded the threshold ITth and the determination of the step S130 is Yes (see FIG. 5). In addition, in the above-described second embodiment, the second driving mode is executed on condition that the accumulated temperature value IT of the current sensor CS1 has exceeded the threshold ITth and the determination of the step S131 is Yes (see FIG. 7). However, a variety of additional conditions may be defined to execute the second driving mode when the accumulated temperature value of the current sensor has exceeded the threshold. For example, an additional condition may be that no signal exists within a predetermined distance in a traveling direction in view of map information. That is, the second driving mode may be executed on the condition that the second driving mode is executable. In this regard, it is preferable to meet the condition that the second driving mode is executable while keeping the amount of the electric power to be supplied to the load equal to the amount of electric power required for the load.

C6. Another Embodiment 6

The present disclosure is not limited to the embodiments, examples, and modifications described above but may be implemented by a diversity of other configurations without departing from the spirit and scope of the present disclosure. For example, technical features in the embodiments, examples, and modifications corresponding to the technical features in each embodiment described in the summary section may be appropriately replaced or combined in order to partially or entirely solve the problem described above or to partially or entirely achieve advantageous effects described above. Any of the technical features may be omitted as appropriate unless the technical feature is described as essential herein.

The disclosure is not limited to any of the embodiment and its modifications described above but may be implemented by a diversity of configurations without departing from the scope of the disclosure. For example, the technical features of any of the above embodiments and their modifications may be replaced or combined appropriately, in order to solve part or all of the problems described above or in order to achieve part or all of the advantageous effects described above. Any of the technical features may be omitted appropriately unless the technical feature is described as essential in the description hereof. The present disclosure may be implemented by aspects described below.

(1) According to one aspect of the present disclosure, a fuel cell system is provided. The fuel cell system comprises a fuel cell, a converter configured to convert output voltage of the fuel cell, a current sensor including a preliminarily magnetized magnetic core and configured to measure current flowing in the converter from the fuel cell, a temperature sensor configured to measure temperature of the current sensor, and a controller configured to control the fuel cell system. The controller, as driving modes of the fuel cell system, comprises a first driving mode in which a maximum value of the current flowing in a target circuit of current measurement by the current sensor is smaller than a current value for preliminary magnetization of the magnetic core and a second driving mode in which a maximum value of the current flowing in the target circuit is larger than the maximum value of the current flowing in the target circuit in the first driving mode. The controller can execute the second driving mode on a predetermined condition when an accumulated temperature value of the current sensor in the first driving mode has exceeded a threshold, and subsequently execute the first driving mode.

With regard to the aspect as described above, as the magnetic core of the current sensor has been preliminarily magnetized, an effect of the magnetization of the magnetic core by the current to be measured can be excluded and an accurate measured current value can be obtained in the first driving mode in which the maximum current value in the target circuit is smaller than the current value for the preliminary magnetization.

In addition, in the aspect described above, the second driving mode is executed when the accumulated temperature value of the current sensor has exceeded a threshold and the measured value of the current sensor is expected to include the deviation. As a result, the current larger than the current in the first driving mode is applied to the target circuit so as to magnetize the magnetic core of the current sensor. Consequently, the accurate measured current value can be obtained without any effect of demagnetization of the magnetic core in the subsequent first driving mode.

(2) In the fuel cell system according to the aspect described above, the converter may comprise a plurality of circuits connected in parallel to each other to form multiple phases. The target circuit may connect one of the plurality of circuits forming the multiple phases and the fuel cell. When compared on a condition that electric power required from the fuel cell is equal, the controller may use one or more circuits from among the plurality of circuits forming the multiple phases to drive the converter in the second driving mode. Number of the one or more circuits to be used is smaller than number of circuits used in the first driving mode, and the one or more circuits to be used includes at least one of the plurality of circuits in which the accumulated temperature value of the current sensor has exceeded the threshold.

Due to the aspect described above, it is possible to set the maximum current value in the target circuit in the second driving mode higher than the maximum current value in the first driving mode so as to magnetize the magnetic core without changing the required electric power from the fuel cell for the magnetization of the magnetic core.

(3) In the fuel cell system according to the aspect described above, a rest of the plurality of circuits forming the multiple phases except for the circuit connected to the fuel cell via the target circuit may also comprise current sensors comprising preliminarily magnetized magnetic cores and configured to measure the current flowing in the circuits from the fuel cell. The controller may be configured to choose at least one of the plurality of circuits that is unfixed as the one or more circuits to be used in the second driving mode when the number of the one or more circuits to be used is smaller than a maximum number of the plurality of circuits forming the multiple phases. When the accumulated temperature values of two or more of the current sensors have exceeded the threshold and the number of the one or more circuits to be used is smaller than a maximum number, the controller may use the one or more circuits including at least one circuit preferentially chosen from among circuits equipped with the two or more of the current sensors in order of the accumulated temperature value from highest to lowest and uses the at least one of the plurality of circuits in the second driving mode. Due to the aspect described above, it is possible to preferentially use the circuit with the current sensor that has a higher risk of including the deviation in the measured value of the current sensor in executing the second driving mode to perform the magnetization.

(4) In the fuel cell system according to the aspect described above, the controller sets output voltage of the converter in the second driving mode higher than output voltage in the first driving mode so as to raise the maximum current value in the target circuit higher than the maximum current value in the target circuit in the first driving mode when compared on a condition that electric power required from the fuel cell is equal.

Due to the aspect described above, it is possible to set the maximum current value in the target circuit higher than the maximum current value in the first driving mode so as to magnetize the magnetic core without changing the required electric power from the fuel cell for the magnetization of the magnetic core.

(5) According to another aspect of the present disclosure, a method for controlling the fuel cell system is provided. The fuel cell system comprises the fuel cell, the converter configured to convert the output voltage of the fuel cell, the current sensor including the preliminarily magnetized magnetic core and configured to measure the current flowing in the converter from the fuel cell, and the temperature sensor configured to measure the temperature of the current sensor. The method for controlling the fuel cell system comprises (a) executing the first driving mode in which the maximum current value in the target circuit of the current measurement by the current sensor is smaller than the current value for the preliminary magnetization of the magnetic core, and (b) executing the second driving mode in which the maximum current value in the target circuit is larger than the maximum current value in the target circuit in the first driving mode. When the accumulated temperature value of the current sensor has exceeded the threshold in the above-described step (a), a process of the method is switched to the step (b) on a predetermined condition and subsequently the process is switched to the step (a).

(6) In the method for controlling the fuel cell system according to the aspect described above, the converter may comprise a plurality of circuits connected in parallel to each other to form multiple phases. The target circuit may connect one of the plurality of circuits forming the multiple phases and the fuel cell. When compared on the condition that the electric power required from the fuel cell is equal, one or more circuits from among the plurality of circuits forming the multiple phases may be used to drive the converter. The number of the one or more circuits to be used in the step (b) may be smaller than number of circuits used in the step (a) and the one or more circuits to be used may comprise at least one of the plurality of circuits in which the accumulated temperature value of the current sensor has exceeded the threshold.

(7) In the method for controlling the fuel cell system according to the aspect described above, a rest of the plurality of circuits forming the multiple phases except for the circuit connected to the fuel cell via the target circuit may also comprise current sensors comprising preliminarily magnetized magnetic cores and may be configured to measure the current flowing in the circuits from the fuel cell. In the step (b), at least one of the plurality of circuits that is unfixed may be chosen as the one or more circuits to be used when the number of the one or more circuits to be used is smaller than a maximum number of the plurality of circuits forming the multiple phases. When the accumulated temperature values of two or more of the current sensors have exceeded the threshold and the number of the one or more circuits to be used is smaller than a maximum number in the step (b), the one or more circuits including at least one circuit preferentially chosen from among circuits equipped with the two or more of the current sensors in order of the accumulated temperature value from highest to lowest may be used and the at least one of the plurality of circuits may be used.

(8) In the method for controlling the fuel cell system according to the aspect described above, in the step (b), output voltage of the converter may be set higher than output voltage in the first driving mode so as to raise the maximum current value in the target circuit higher than the maximum current value in the target circuit in the step (a) when compared on a condition that electric power required from the fuel cell is equal.

Not all of the features included in each aspect of the present disclosure described above are essential. Part of the features described above may be appropriately modified, eliminated and replaced with a new different feature and part of restrictions may be eliminated in order to solve part or all of the problems described above or in order to achieve part or all of the advantageous effects described herein. Moreover, in order to solve part or all of the problems described above or in order to achieve part or all of the advantageous effects described herein, part or all of the technical features included in one aspect of the present disclosure described above may be combined with part or all of the technical features included in the other aspects of the present disclosure described above so as to constitute an independent aspect of the present disclosure.

What is claimed is:

1. A fuel cell system comprising:
    a fuel cell;
    a converter configured to convert output voltage of the fuel cell;
    a current sensor comprising a preliminarily magnetized magnetic core and configured to measure current flowing in the converter from the fuel cell;
    a temperature sensor configured to measure temperature of the current sensor; and
    a controller configured to control the fuel cell system, wherein the controller is configured to execute, as driving modes of the fuel cell system:
        a first driving mode in which a maximum current value in a target circuit of current measurement by the current sensor is set to be lower than a current value for preliminary magnetization of the magnetic core; and
        a second driving mode in which a maximum current value in the target circuit is set to be higher than the maximum current value in the target circuit in the first driving mode, and
    wherein when an accumulated temperature value of the current sensor in the first driving mode has exceeded a threshold, the controller is configured to:
        execute the second driving mode on a predetermined condition, and
        subsequently execute the first driving mode.

2. The fuel cell system according to claim 1, wherein the converter comprises a plurality of circuits connected in parallel to each other to form multiple phases, wherein
    the target circuit connects one of the plurality of circuits forming the multiple phases and the fuel cell, and wherein
    the controller is configured to use one or more circuits from among the plurality of circuits forming the multiple phases to drive the converter in the second driving mode, wherein
        when an equal amount of electric power is required from the fuel cell in the first driving mode and in the second driving mode, a number of the one or more circuits to be used in the second driving mode is smaller than a number of circuits used in the first driving mode, and
        the one or more circuits to be used in the second driving mode comprises at least one of the plurality of circuits in which the accumulated temperature value of the current sensor has exceeded the threshold.

3. The fuel cell system according to claim 2, wherein a rest of the plurality of circuits forming the multiple phases except for the circuit connected to the fuel cell via the target circuit also comprise current sensors comprising preliminarily magnetized magnetic cores and configured to measure the current flowing in the circuits from the fuel cell, and wherein
    the controller is configured to choose at least one of the plurality of circuits that is unfixed as the one or more circuits to be used in the second driving mode when the number of the one or more circuits to be used in the second driving mode is smaller than a maximum number of the plurality of circuits forming the multiple phases, and
    when the accumulated temperature values of two or more of the current sensors have exceeded the threshold and the number of the one or more circuits to be used in the second driving mode is smaller than a maximum number, the controller is configured to use the one or more circuits including at least one circuit preferentially chosen from among circuits equipped with the two or more of the current sensors in order of the accumulated temperature value from highest to lowest and to use the at least one of the plurality of circuits in the second driving mode.

4. The fuel cell system according to claim 1, wherein when an equal amount of electric power is required from the fuel cell in the first driving mode and in the second driving mode, the controller is configured to set an output voltage of the converter in the second driving mode to be higher than the output voltage of the converter in the first driving mode, so as to raise the maximum current value in the target circuit to be higher in the second driving mode than the maximum current value in the target circuit in the first driving mode.

5. A method for controlling a fuel cell system, the fuel cell system comprising:
   a fuel cell;
   a converter configured to convert output voltage of the fuel cell;
   a current sensor comprising a preliminarily magnetized magnetic core and configured to measure current flowing in the converter from the fuel cell; and
   a temperature sensor configured to measure temperature of the current sensor,
the method for controlling the fuel cell system comprising:
   (a) executing a first driving mode in which a maximum current value in a target circuit of current measurement by the current sensor is set to be lower than a current value for preliminary magnetization of the magnetic core; and
   (b) executing a second driving mode in which a maximum current value in the target circuit is set to be higher than the maximum current value in the target circuit in the first driving mode, wherein
   when an accumulated temperature value of the current sensor has exceeded a threshold in the step (a),
      a process of the method is switched to the step (b) on a predetermined condition, and
      subsequently the process is switched to the step (a).

6. The method for controlling the fuel cell system according to claim 5, wherein
   the converter comprises a plurality of circuits connected in parallel to each other to form multiple phases, wherein
   the target circuit connects one of the plurality of circuits forming the multiple phases and the fuel cell, and wherein
   in the step (b), one or more circuits from among the plurality of circuits forming the multiple phases are used to drive the converter, wherein
      when an equal amount of electric power is required from the fuel cell in the step (a) and in the step (b), a number of the one or more circuits to be used in the step (b) is smaller than a number of circuits used in the step (a), and
      the one or more circuits to be used in the step (b) comprises at least one of the plurality of circuits in which the accumulated temperature value of the current sensor has exceeded the threshold.

7. The method for controlling the fuel cell system according to claim 6, wherein
   a rest of the plurality of circuits forming the multiple phases except for the circuit connected to the fuel cell via the target circuit also comprise current sensors comprising preliminarily magnetized magnetic cores and configured to measure the current flowing in the circuits from the fuel cell, and wherein
   in the step (b), at least one of the plurality of circuits that is unfixed is chosen as the one or more circuits to be used in the step (b) when the number of the one or more circuits to be used in the step (b) is smaller than a maximum number of the plurality of circuits forming the multiple phases, and
   when the accumulated temperature values of two or more of the current sensors have exceeded the threshold and the number of the one or more circuits to be used in the step (b) is smaller than a maximum number in the step (b), the one or more circuits including at least one circuit preferentially chosen from among circuits equipped with the two or more of the current sensors in order of the accumulated temperature value from highest to lowest are used and the at least one of the plurality of circuits is used.

8. The method for controlling the fuel cell system according to claim 5, wherein
   when an equal amount of electric power is required from the fuel cell in the step (a) and in the step (b), an output voltage of the converter in the step (b) is set to be higher than the output voltage of the converter in the step (a), so as to raise the maximum current value in the target circuit to be higher in the step (b) than the maximum current value in the target circuit in the step (a).

* * * * *